US009450442B2

(12) United States Patent
Aggeler et al.

(10) Patent No.: US 9,450,442 B2
(45) Date of Patent: Sep. 20, 2016

(54) CONVERTER FOR A BATTERY CHARGING STATION

(71) Applicant: ABB Technology AG, Zürich (CH)

(72) Inventors: Daniel Aggeler, Zürich (CH); Francisco Canales, Baden-Dättwil (CH); Georgios Papafotiou, Allenwinden (CH); River-TinHo Li, Diamond Hill (HK); Oscar Apeldoorn, Lengnau (CH)

(73) Assignee: ABB Technology AG, Zurich (CH)

(\*) Notice: Subject to any disclaimer, the term of this patent is extended or adjusted under 35 U.S.C. 154(b) by 97 days.

(21) Appl. No.: 14/451,969

(22) Filed: Aug. 5, 2014

(65) Prior Publication Data

US 2014/0340041 A1    Nov. 20, 2014

Related U.S. Application Data

(63) Continuation of application No. PCT/EP2013/051151, filed on Jan. 22, 2013.

(30) Foreign Application Priority Data

Feb. 6, 2012 (EP) .................................... 12154014

(51) Int. Cl.
*H02J 7/00* (2006.01)
*H02J 1/10* (2006.01)
*H02J 7/02* (2016.01)
*B60L 11/18* (2006.01)

(52) U.S. Cl.
CPC ............ *H02J 7/007* (2013.01); *B60L 11/1824* (2013.01); *B60L 11/1842* (2013.01);

(Continued)

(58) Field of Classification Search
CPC ....................................................... H02J 7/007
USPC .......................... 320/109, 138, 140, 162–164
See application file for complete search history.

(56) References Cited

U.S. PATENT DOCUMENTS

| 6,314,009 | B1 | 11/2001 | Dittmer et al. |
| 7,135,836 | B2 * | 11/2006 | Kutkut .................. H02J 7/022 |
| | | | 320/116 |

(Continued)

FOREIGN PATENT DOCUMENTS

| DE | 195 46 495 A1 | 6/1997 |
| DE | 198 05 926 A1 | 8/1999 |

OTHER PUBLICATIONS

International Search Report (PCT/ISA/210) mailed on Jul. 22, 2013, by the European Patent Office as the International Searching Authority for International Application No. PCT/EP2013/051151.

(Continued)

*Primary Examiner* — Richard V Muralidar
(74) *Attorney, Agent, or Firm* — Taft Stettinius & Hollister LLP

(57) ABSTRACT

A modular converter is disclosed for a battery charging station, having at least two charging modules connected in parallel. Each of the charging modules can be configured for generating an output current $I_1$, $I_2$, $I_3$ for charging a battery. Each charging module can have a local controller for controlling the charging module. Each local controller of a charging module can be configured for determining a global charging current I and for determining the output current $I_1$, $I_2$, $I_3$ of the charging module.

16 Claims, 2 Drawing Sheets

(52) U.S. Cl.
CPC ........... *B60L 11/1844* (2013.01); *H02J 1/102* (2013.01); *H02J 7/0027* (2013.01); *H02J 7/0052* (2013.01); *H02J 7/02* (2013.01); *B60L 2210/00* (2013.01); *B60L 2230/10* (2013.01); *H02J 2007/0059* (2013.01); *Y02E 60/721* (2013.01); *Y02T 10/7005* (2013.01); *Y02T 10/7055* (2013.01); *Y02T 10/7088* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 7,688,607 B2 * | 3/2010 | Schultz | H02J 3/1842 363/72 |
| 8,848,409 B2 * | 9/2014 | Dujic | H02M 1/4233 363/79 |
| 2004/0041473 A1 | 3/2004 | Deguchi | |
| 2004/0189251 A1 | 9/2004 | Kutkut et al. | |
| 2010/0277140 A1 | 11/2010 | Liu | |

OTHER PUBLICATIONS

Written Opinion (PCT/ISA/237) mailed on Jul. 22, 2013, by the European Patent Office as the International Searching Authority for International Application No. PCT/EP2013/051151.

Search Report mailed on Jul. 17, 2012, by the European Patent Office for Application No. 12154014.0.

* cited by examiner

CONVERTER FOR A BATTERY CHARGING STATION

RELATED APPLICATION(S)

This application claims priority as a continuation application under 35 U.S.C. §120 to PCT/EP2013/051151, which was filed as an International Application on Jan. 22, 2013, designating the U.S., and which claims priority to European Application 12154014.0 filed in Europe on Feb. 6, 2012. The entire contents of these applications are hereby incorporated by reference in their entireties.

FIELD

The present disclosure relates to the field of battery storage applications. For example, the present disclosure relates to a modular converter for a battery charging station, a battery charging station and a method of charging a battery.

BACKGROUND INFORMATION

Due to the electrification of the transportation sector, in the form of hybrid or fully electric vehicles, there is a rising need for battery charging stations for these vehicles. In such a charging station, a battery or accumulator that is used for supplying a drive of the vehicle with electrical power may be charged with electrical energy drawn from a large-scale power grid.

Known battery charging has been slow, ranging within a few hours. However, the development of new fast charging algorithms and of new power electronic converters makes it possible to charge a battery within about 20 minutes. However, such fast charging algorithms may degrade the efficiency of the charging due to high losses of the electric converters.

For enhancing the efficiency of universal battery charging, for example for e-mobility applications, modular converters have been proposed that include a plurality of charging modules, each of which generates a part of the charging current to be supplied to the battery.

In US 2004/0189251 A1 a master-slave configuration has been proposed for controlling the charging modules. The measurements of the battery voltage are led to a central (master) controller, where the battery charging information is also stored. The calculations of the current references for the modules are then done centrally, and the information about the reference value for the current of each individual module is communicated to local (slave) controllers that are responsible for the operation of each individual charging module.

SUMMARY

A modular converter for a battery charging station is disclosed, wherein the modular converter comprises: at least two charging modules connected in parallel, each of the charging modules being configured for generating an output current ($I_1$, $I_2$, $I_3$) for charging a battery; and each charging module containing a local controller for controlling the charging module, wherein each local controller of a charging module is configured for determining a global charging current (I) and for determining the output current ($I_1$, $I_2$, $I_3$) of the charging module from the global charging current (I).

A battery charging station is disclosed comprising: a connection to a power grid, at least one connection for interconnecting a battery, and a modular converter for converting a current from the power grid into a charging current (I) for charging the battery.

A method of charging a battery with a modular converter is disclosed, the method comprising: determining a global current (I) for charging the battery by a first local controller and a second local controller; calculating a first output current ($I_1$) for a first charging module by the first local controller based on the global current (I); controlling the first charging module by the first local controller, such that the first charging module generates the first output current ($I_1$); calculating a second output current ($I_2$) for a second charging module by the second local controller based on the global current (I); and controlling the second charging module by the second local controller, such that the second charging module generates the second output current ($I_2$).

BRIEF DESCRIPTION OF THE DRAWINGS

The subject matter disclosed herein will be explained in more detail in the following text with reference to exemplary embodiments which are illustrated in the attached drawings, wherein.

In principle, identical parts are provided with the same reference symbols in the figures.

DETAILED DESCRIPTION

Figure 1:
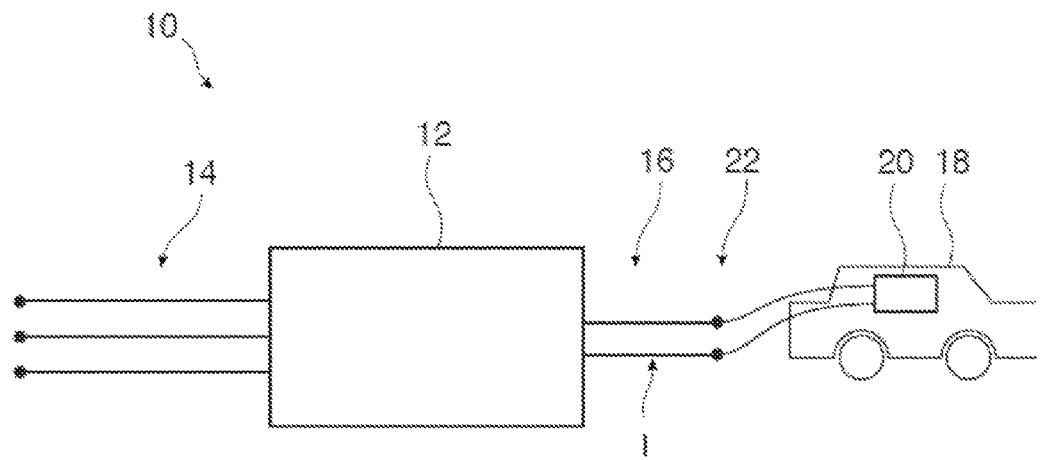
FIG. 1 schematically shows a battery loading station according to an exemplary embodiment disclosed herein.

In a master slave configuration of controllers of a converter, an exchange of charging modules of the converter may be complicated, since not only the respective charging module is to be exchanged, but also the central controller is to be adapted to the new charging module, which may have different operation parameters.

Exemplary embodiments disclosed herein can simplify the design and the maintenance of battery charging stations.

An exemplary aspect disclosed herein relates to a modular converter for a battery charging station, which may be any system adapted for charging batteries. For example, the battery charging station or system is adapted for charging vehicle batteries, such as batteries that are used for storing electrical energy for the drive of an electric or hybrid vehicle.

According to an exemplary embodiment, the modular converter can include at least two or a plurality of charging modules electrically connected in parallel. Each of the charging modules is adapted for generating a (local) output current for charging a battery, for example a vehicle battery. Since the charging modules are connected in parallel, the local output currents may add to the global charging current. By using a modular approach, the converter may be maintained more easily and the efficiency of the charging may be enhanced.

According to an exemplary embodiment, each charging module can include a local controller for controlling the charging module, such as for controlling the output current of the respective charging module. For example, the local controller may be adapted for PWM-modulate an inverter of the charging module based on a reference value for the output current.

According to an exemplary embodiment, each local controller of a charging module can be adapted (i.e., configured) for determining a global charging current and for determining the output current of the respective charging module (associated with the local controller) from the determined global charging current. For example, all local controllers may execute the same algorithm, which determines the output current for all modules.

It may be seen as an exemplary focus, that every local controller of a charging module is adapted for directly determining the output current (reference) of the associated charging module from a global charging current (reference), for example without a central controller. The computational intelligence of a central controller may be distributed to local controllers of charging modules. In such way, the local controllers may be completely or at least partly autonomous.

According to an exemplary embodiment, each local controller can be adapted for receiving a charging voltage value measured in an output line of the converter. For example, the charging voltage or the battery voltage may be measured in the output line of the converter with a measurement device that sends the measured values to all local controllers. Therefore, every local controller is adapted for determining the global output or charging current locally.

According to an exemplary embodiment, each local controller is adapted for determining the global charging current from the charging voltage value. For example, a functional relationship between the charging voltage and the charging current may be evaluated by the local controller. Furthermore, in each local controller a charging profile interrelating the charging voltage and the charging current may be stored. Each local controller may be adapted for determining the charging current from the charging profile.

According to an exemplary embodiment, each local controller is adapted for receiving a voltage and/or current information from the battery and/or each local controller is adapted for determining the output current from the voltage and/or current information from the battery. Instead of a charging profile stored in the local controller, the output current may be determined from information directly received from the battery. For example, a maximal voltage value may be received from the battery and may be compared with the measured charging voltage value for determining the global charging current.

According to an exemplary embodiment, the local controllers can be equally or similarly designed. For example, the local controllers may include equally designed microprocessors and may store the same software. In the case that the charging modules are not equally designed, for example may have different maximal output power, only operational parameters (for example the maximal output power of the respective charging module) may be adapted in a local controller.

According to an exemplary embodiment, the charging modules can be equally or similarly designed. Also, the charging modules may have the same design and for example the same output power.

According to an exemplary embodiment, a local controller of a charging module is mechanically attached to the charging module. For example, a local controller may be arranged on the same board as the associated charging module and/or may be situated in the housing of the associated charging module. In such a way, the charging modules may be exchanged together with their local controllers.

According to an exemplary embodiment, the local controllers can be communicatively interconnected with each other. For example, the modular converter can include a communication system or a communication line via which the local controllers may exchange data. For example, the local controllers may be connected in a ring structure. For example, the local controllers may be connected with no differentiation between master-slave or hierarchy among them.

According to an exemplary embodiment, the local controllers can be adapted to exchange output current reference values with each other. Thus, one of the local controllers may determine the output current of another local controller and/or the local controllers may verify, whether there are differences between their local calculations.

A further exemplary aspect disclosed herein relates to a battery charging station or battery charging system, for example for charging vehicle batteries.

According to an exemplary embodiment, the battery charging station can include a connection to a power grid, at least one connection for interconnecting a battery, and a converter for converting the current from the power grid into a current for charging the battery. In such a charging station, which may be compared to a petrol station, electric or hybrid vehicles may be charged, e.g., the battery charging station may be a vehicle charging station.

A further exemplary aspect disclosed herein relates to a method of charging a battery with a modular converter, such as the modular converter as described herein.

According to an exemplary embodiment, the method can include: determining a global current for charging the battery by a first local controller and a second local controller; calculating a first output current for a first charging module by the first local controller based on the global current; controlling the first charging module by the first local controller, such that the first charging module generates the first output current; calculating a second output current for a second charging module by the second local controller based on the global current; and controlling the second charging module by the second local controller, such that the second charging module generates the second output current. In other words, the output currents of the charging modules may be calculated locally by the local controllers.

According to an exemplary embodiment, the global current could also be determined by the first local controller or the second local controller. In such a case, the global current is for example only determined by the first local controller and the first local controller may send the global current (reference value) to the second local controller.

According to an exemplary embodiment, the first output current is sent from the first local controller to the second local controller and the second output current is calculated in the second local controller based on the first output current. In such a way, the local controllers may be connected in a ring-like-topology, wherein each subsequent local controller (locally) determines its output current based on the information received from an antecedent local controller.

According to an exemplary embodiment, the output current of a charging module is calculated by dividing the global current by a number of charging modules of the modular converter. This may be possible if, for example, the charging modules are adapted for generating the same output power and/or all have the same efficiency.

According to an exemplary embodiment, the output currents can be modified (e.g., optimized), such that losses of the charging modules are minimized. The local controllers may have knowledge about the efficiency and/or maximal output power of the charging modules and may enhance (e.g., optimize) the output currents with respect to these values. For example, every local controller may store the efficiency and/or the maximal output power of the associated charging module. These values may be exchanged between the local controllers via the communication system. Such an optimal load distribution algorithm may allow for an autonomous operation of all charging modules in a coordinated way and may allow the overall correct operation of the battery charging station.

According to an exemplary embodiment, the output currents can be modified (e.g., optimized), such current ripples in the output currents are optimized, for example minimized. For example, the output currents may be optimized to achieve a desired current ripple in a specific output current, which may help to extend the lifetime of the battery.

According to an exemplary embodiment, the global current is determined to be negative, such that the battery is discharging and the battery may be used as energy storage. It should be noted that the battery in the charging station may be used as an intermediate energy storage as long as it is connected to the charging station. For example, the battery may be used for supporting the power grid the charging station is connected to. In this case, the power stored in the battery flows from the battery to the charging station and the global charging current is negative. Also, the discharging of the battery may be controlled by the local controllers.

It should be understood that features of exemplary methods as described herein may be features of the system as described herein. For example, the local controllers of the modular converter may be adapted for performing the method as described in the above and in the following.

These and other aspects developed herein will be apparent from and elucidated with reference to the embodiments described hereinafter with respect to FIGS. 1-3.

FIG. 1 schematically shows an exemplary vehicle charging station 10, which includes an electrical modular converter 12 that is connected via an input line 14 to an electrical grid and that is adapted to generate a charging current I in an output line 16. The input current in the input line 14 can, for example, be a three phase AC current. For example, the output current I is a DC current.

A vehicle 18 may be connected to the charging station 10, by interconnecting a battery 20 of the vehicle 18 to the output line 16. For example, the charging station 10 may include a connection point or plug 22 for connecting a cable to charge the battery 20.

It should be understood that a vehicle charging station 10 can, for example, have a plurality of output lines 16 and a plurality of connection points 22 that have been omitted for reasons of simplicity.

Figure 2:
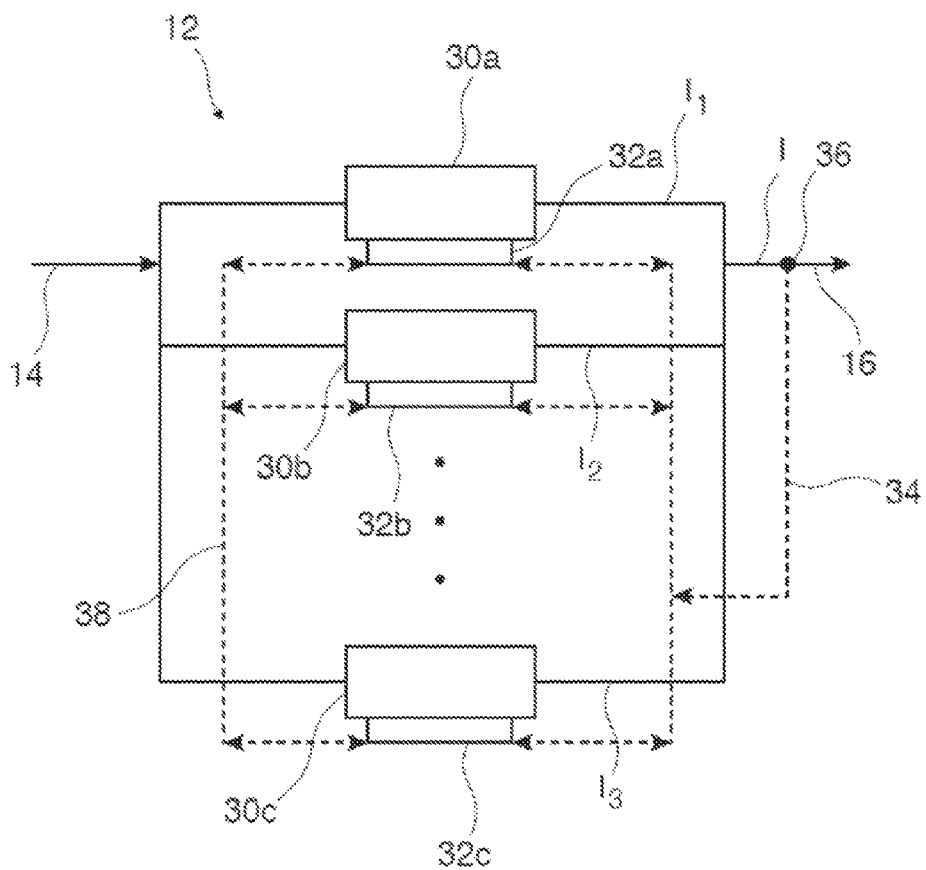
FIG. 2 schematically shows a modular converter according to an exemplary embodiment disclosed herein.

FIG. 2 schematically shows an exemplary modular converter 12 having a plurality of base power modules or charging modules 30a, 30b, 30c. Each charging module 30a, 30b, 30c can include a local controller 32a, 32b, 32c that controls its respective charging module 30a, 30b, 30c.

For example, each charging module 30a, 30b, 30c may include a first rectifier for rectifying the input current from the input line 14, an inverter for generating a further AC current with different frequency and a second rectifier for rectifying the further AC current. Furthermore, each charging module 30a, 30b, 30c may include a single or multi-stage DC-to-DC converter for adjusting the voltage of the output current.

The local controllers 32a, 32b, 32c of the charging modules 30a, 30b, 30c can be adapted for controlling the inverter and the DC-to-DC converter in such a way that an output current $I_1$, $I_2$, $I_3$ of a specific magnitude is generated. Since the charging modules 30a, 30b, 30c are connected in parallel, the output currents $I_1$, $I_2$, $I_3$ add up to the global charging current I. In such a way, the local controllers 32a, 32b, 32c control the charging current I of the charging station 10.

It should be noted that the modular converter 12 can have only local controllers 32a, 32b, 32c and no central controller for controlling the charging current I.

Each of the local controllers 32a, 32b, 32c is, for example, connected via a first signal line 34 to a measurement device 36 in the output line 16, which is adapted to measure the actual voltage of the battery 20. Thus, each local controller 32a, 32b, 32c may receive information about the voltage and/or current in the output line 16 as a charging voltage and/or current value or battery voltage value measured in the output line 16.

Furthermore, the local controllers 32a, 32b, 32c can be communicatively interconnected with each other via a communications system 38. The communication system 38 may be a bus system or may have a ring topology. Each local controller 32a, 32b, 32c may exchange data with each other local controller 32a, 32b, 32c.

The charging modules 30a, 30b, 30c may, for example, be equally or similarly configured and/or designed and/or may have an individual maximal power output. In any case, the local controllers 32a, 32b, 32c may be equally or similarly designed and, for example, only operation parameters (such as the maximal power output and the efficiency) of the associated charging module 30a, 30b, 30c may be individually set in the local controllers 32a, 32b, 32c.

The charging modules 30a, 30b, 30c may be designed as cartridges that may be exchangeable in the converter 12. The local controller 32a, 32b, 32c of a charging module 30a, 30b, 30c may be directly attached to its charging module 30a, 30b, 30c, such that it may be exchanged with the charging module 30a, 30b, 30c together. However, a local controller 32a, 32b, 32c may be situated remote from the associated charging module 30a, 30b, 30c. A local controller may 32a, 32b, 32c may be connected via fibre optics or electrical lines with the associated charging module 30a, 30b, 30c.

If the charging station contains more than one connection point 22 for connecting a battery, it is possible that the modular converter 12 can include further switches that interconnect groups of charging modules with the connection points. In such a way, the number of charging modules connected with a connection point and therefore the maximal output power at the connection point may be adjusted.

Figure 3:
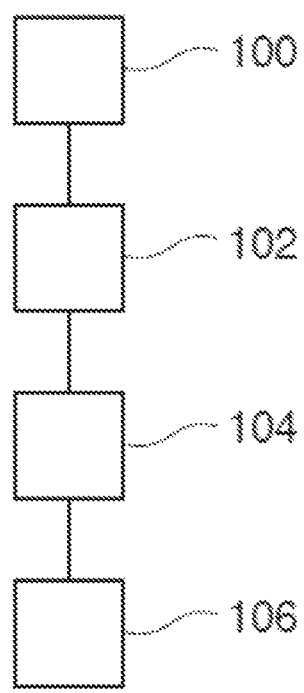
FIG. 3 shows a flow diagram for an exemplary method for charging a battery according to an exemplary embodiment disclosed herein.

FIG. 3 shows an exemplary flow diagram for a method of charging the battery 20.

In step 100, the charging or battery voltage is measured in the output line 16 by the measurement device 36 and sent to each local controller 32a, 32b, 32c. The battery voltage measurements may be communicated to all local controller 32a, 32b, 32c of all charging modules 30a, 30b, 30c simultaneously.

In step 102, a global charging current reference value is determined. The global charging current reference value specifies the global charging current the modular converter 12 needs to provide to the battery 20. The global charging current reference value may be positive, when the battery is to be charged and it may be negative, when the battery is to be discharged.

The global charging current reference value may be individually determined by each local controller 32a, 32b, 32c or may be determined only by one of the local controllers 32a, (e.g., a first local controller 32a) and then be sent to the other local controllers 32b, 32c or one subsequent local controller 32b.

In the second case, the local controllers 32a, 32b, 32c may determine a first local controller 32a, that will perform the calculations at the first time and will send the results to the other controllers 32b, 32c or one subsequent local controller 32b. However, the role of the first controller 32a may be captured by every local controller 32a, 32b, 32c.

In any case, the global charging current reference value may be determined from the measured charging voltage based on a predefined charging profile that may be stored in the local controller 32a, 32b, 32c. Alternatively or additionally, the global charging current may be determined based on voltage and/or current information directly received from the battery. In step 104, a local output current reference value is determined for each charging module 30a, 30b, 30c by the associated local controller 32a, 32b, 32c. A local output current reference value specifies the output current of the respective charging module 30a, 30b, 30c. All local output current reference value may add to the global charging current reference value.

For example, the local output current reference value for a charging module 30a, 30b, 30c may be determined by the associated local controller 32a, 32b, 32c without knowledge of output currents of other local controllers. Alternatively, the first local controller 32a may determine its output current $I_1$ and may send a reference value for the first output current $I_1$ to the second local controller 32b, which uses this reference value for determining the second output current $I_2$. A reference value of the second output current $I_2$ may be sent to the third local controller 32c for determining a third output current $I_3$, and so on.

By determining the output current reference values, the global charging current reference value is split or distributed between the different charging modules 30a, 30b, 30c, deciding how much power each one will contribute to the charging.

The distribution may be done either through a straightforward calculation (total or global charging current I divided by the number of charging modules 30a, 30b, 30c) or by an algorithm deciding the optimal operating point of each charging module 30a, 30b, 30c based on the overall system efficiency maximization, the optimal operation point and/or the output current ripple.

The output current references may be calculated by dividing the computed global charging current reference value by the total number of modules. Communication between the local controllers 32a, 32b, 32c may be used to ensure that the calculation is done consistently in all local controllers 32a, 32b, 32c.

Alternatively, the output current references may be calculated by employing an optimization algorithm that additionally takes efficiency characteristics of the charging modules into account. Specifically, if each charging module 30a, 30b, 30c is consisting of its output power $P_j$, its efficiency $n_j$, and its maximum power $P_{j,max}$ then an exemplary goal of the optimization algorithm may be stated as:

$$\min \sum (1 - \eta_j) P_j$$
s.t.

$$\sum P_j = P_{tot}$$
$$P_j \leq P_{j,max}, \forall j$$

e.g., choose the individual charging module power contribution, and therefore the local output current reference values of the charging modules such that the sum of the module losses is minimized, while the total requested power (depending on charging voltage and global charging current) is delivered and the individual maximum power constraints are respected. The algorithm may then be solved in either a sequential or a distributed manner, depending on the computational resources available in each local controller 32a, 32b, 32c.

In step 106, the local controllers 32a, 32b, 32c control the associated charging module 30a, 30b, 30c to generate an output current $I_1$, $I_2$, $I_3$ corresponding to the local output current reference value.

Each local controller 32a, 32b, 32c may include a microprocessor, for example a DSP or FPGA, which is adapted for executing the algorithms as explained herein.

While embodiments of the disclosure have been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practising the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims (e.g., be configured with software stored in a non-transitory state). The mere fact that certain measures are recited in mutually different dependent claims does not indicate that a combination of these measures cannot be used to advantage. Any reference signs in the claims should not be construed as limiting the scope.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A modular converter for a battery charging station, wherein the modular converter comprises:
   at least two charging modules connected in parallel, each of the charging modules being configured for generating an output current ($I_1$, $I_2$) for charging a battery; and
   each charging module containing a local controller for controlling the charging module,
   wherein each local controller of a charging module is configured for determining a global charging current (I) and for determining the output current ($I_1$, $I_2$,) of the charging module from the global charging current (I).

2. The modular converter of claim 1, wherein each local controller is configured for receiving a charging voltage value measured in an output line of the modular converter; and wherein each local controller is configured for determining the global charging current (I) from the charging voltage value.

3. The modular converter of claim 1, wherein each local controller is configured for receiving a voltage and/or current information from the battery; and
wherein each local controller is configured for determining the output current ($I_1$, $I_2$) from the voltage and/or current information from the battery.

4. The modular converter claim 1, wherein the local controllers are equally designed.

5. The modular converter of claim 1, wherein the charging modules are equally designed.

6. The modular converter of claim 1, wherein a local controller of a charging module is mechanically attached to the charging module.

7. The modular converter of claim 1, wherein the local controllers are communicatively interconnected with each other.

8. The modular converter of claim 1, wherein the local controllers are configured to exchange output current values with each other.

9. A battery charging station, comprising:
a connection to a power grid;
at least one connection for interconnecting a battery; and
a modular converter according to claim 1 for converting a current from the power grid into a charging current (I) for charging the battery.

10. The battery charging station of claim 9, wherein the battery charging station is a vehicle charging station.

11. A method of charging a battery with a modular converter, the method comprising:
determining a global current (I) for charging the battery by a first local controller and a second local controller;
calculating a first output current (I1) for a first charging module by the first local controller based on the global current (I);
controlling the first charging module by the first local controller, such that the first charging module generates the first output current ($I_1$);
calculating a second output current ($I_2$) for a second charging module by the second local controller based on the global current (I); and
controlling the second charging module by the second local controller, such that the second charging module generates the second output current ($I_2$).

12. The method of claim 11, comprising:
sending the first output current ($I_1$) from the first local controller to the second local controller; and
calculating the second output current ($I_2$) based on the first output current ($I_1$).

13. The method of claim 11, wherein an output current is calculated by dividing the global current (I) by a number of charging modules of the modular converter.

14. The method of claim 11, wherein output currents are optimized, such that losses of charging modules are minimized, an operation point of the modular converter is enhanced and/or current ripples in the output currents are reduced.

15. The method of claim 11, wherein the global current (I) is determined to be negative, such that the battery is discharging, and the battery is used as energy storage.

16. The modular converter of claim 1,
wherein the local controllers of the modular converter are configured with software stored in a non-transitory state for performing a method which comprises:
determining a global current (I) for charging the battery by a first local controller and a second local controller;
calculating a first output current ($I_1$) for a first charging module by the first local controller based on the global current (I);
controlling the first charging module by the first local controller, such that the first charging module generates the first output current ($I_1$);
calculating a second output current ($I_2$) for a second charging module by the second local controller based on the global current (I); and
controlling the second charging module by the second local controller, such that the second charging module generates the second output current ($I_2$).

* * * * *

UNITED STATES PATENT AND TRADEMARK OFFICE
CERTIFICATE OF CORRECTION

PATENT NO. : 9,450,442 B2  
APPLICATION NO. : 14/451969  
DATED : September 20, 2016  
INVENTOR(S) : Daniel Aggeler et al.

Page 1 of 1

It is certified that error appears in the above-identified patent and that said Letters Patent is hereby corrected as shown below:

In the Claims

Column 8, line 62, delete the "," after "$_2$"

Column 9, line 10, insert --of-- after the word "converter"

Column 9, line 35, replace the number "1" with a "$_1$"

Signed and Sealed this  
Twenty-ninth Day of November, 2016

Michelle K. Lee  
*Director of the United States Patent and Trademark Office*